United States Patent
Desouza et al.

(10) Patent No.: US 7,600,258 B2
(45) Date of Patent: Oct. 6, 2009

(54) METHODS AND SYSTEMS FOR DETECTING AND PREVENTING THE SPREAD OF MALWARE ON INSTANT MESSAGING (IM) NETWORKS BY USING FICTITIOUS BUDDIES

(75) Inventors: Francis Aurelio Desouza, Somerville, MA (US); Jon Sakoda, Boston, MA (US); Arthur William Gilliland, Jamaica Plain, MA (US); Anandamoy Roychowdhary, Cambridge, MA (US); Eric Lyle Lorenzo, Somerville, MA (US); Milan Shah, Hopkinton, MA (US)

(73) Assignee: Symantec Corporation, Cupertino, CA (US)

( * ) Notice: Subject to any disclaimer, the term of this patent is extended or adjusted under 35 U.S.C. 154(b) by 789 days.

(21) Appl. No.: 11/171,248

(22) Filed: Jul. 1, 2005

(65) Prior Publication Data

US 2007/0006308 A1    Jan. 4, 2007

(51) Int. Cl.
  *G06F 12/14*   (2006.01)
  *H04L 9/32*    (2006.01)
(52) U.S. Cl. ........................................ 726/24
(58) Field of Classification Search ............... 726/24
  See application file for complete search history.

(56) References Cited

U.S. PATENT DOCUMENTS

| | | | |
|---|---|---|---|
| 6,052,709 | A  | 4/2000  | Paul |
| 6,112,227 | A  | 8/2000  | Heiner |
| 6,769,016 | B2 | 7/2004  | Rothwell et al. |
| 6,842,773 | B1 | 1/2005  | Ralston et al. |
| 6,965,919 | B1 | 11/2005 | Woods et al. |
| 7,016,939 | B1 | 3/2006  | Rothwell et al. |
| 7,069,316 | B1 | 6/2006  | Gryaznov |
| 7,200,638 | B2 * | 4/2007 | Lake ........................ 709/206 |
| 7,287,060 | B1 | 10/2007 | McCown et al. |
| 7,290,033 | B1 | 10/2007 | Goldman et al. |
| 7,321,922 | B2 | 1/2008  | Zheng et al. |
| 7,321,969 | B2 | 1/2008  | Schoen et al. |
| 2003/0101353 | A1 | 5/2003 | Tarquini et al. |
| 2004/0148281 | A1 | 7/2004 | Bates et al. |
| 2004/0177110 | A1 | 9/2004 | Rounthwaite et al. |
| 2004/0250124 | A1 | 12/2004 | Chesla et al. |
| 2005/0044160 | A1 | 2/2005 | McElligott |
| 2005/0050222 | A1 | 3/2005 | Packer |

(Continued)

OTHER PUBLICATIONS

Archive of "Bayesian filter", Webopedia Computer Dictionary [online], Jul. 20, 2004, 2 pages, [Retrieved on Jan. 5, 2009] Retrieved from the Internet: <URL: http://web.archive.org/web/20040725075627/http://www.webopedia.com/TERM/B/Bayesian_filter.html>.

(Continued)

*Primary Examiner*—Benjamin E Lanier
*Assistant Examiner*—Devin Almeida
(74) *Attorney, Agent, or Firm*—Fenwick & West LLP

(57) ABSTRACT

Methods and systems for reducing the spread of malware in communication between an instant message (IM) client and an IM server are described. An IM filter module (IM FM) is configured to intercept a buddy list sent from an IM server to an IM client, add one or more fictitious buddies to the intercepted buddy list, and forward the buddy list with the one or more fictitious buddies to the IM client. The IM FM is further configured to identify a computer that hosts the IM client as a source of malware based on messages sent by the IM client to at least one of the fictitious buddies and to determine that the host computer of the IM client is a source of malware if a content of the messages sent to the at least one of the fictitious buddies contains malware.

37 Claims, 15 Drawing Sheets

U.S. PATENT DOCUMENTS

| | | |
|---|---|---|
| 2005/0076084 A1 | 4/2005 | Loughmiller et al. |
| 2005/0138132 A1 | 6/2005 | Zhou et al. |
| 2005/0262210 A1 | 11/2005 | Yu |
| 2006/0036693 A1 | 2/2006 | Hulten et al. |
| 2006/0101021 A1 | 5/2006 | Davis et al. |
| 2006/0112430 A1 | 5/2006 | Deisenroth et al. |
| 2006/0179113 A1 | 8/2006 | Buckingham et al. |

OTHER PUBLICATIONS

Hindocha et al., "Malicious Threats and Vulnerabilities in Instant Messaging", Virus Bulletin International Conference, Sep. 2003, 24 pages, Virus Bulletin, Ltd.

Hindocha, N., "Instant Insecurity: Security Issues of Instant Messaging", SecurityFocus.com Website [online], Jan. 13, 2003, 9 pages, [Retrieved on Mar. 17, 2009] Retrieved from the Internet: <URL:http://www.securityfocus.com/infocus/1657>.

Oikarinen et al., "Internet Relay Chat Protocol", RFC1459 [online], May 1993, pp. 1-3, 13-15, 32, 65, [Retrieved on Jul. 31, 2008] Retrieved from the Internet: <URL: http://www.faqs.org/ftp/rfc/pdf/rfc1459.txt.pdf>.

Williamson et al., "Virus Throttling for Instant Messaging", Apr. 28, 2004, 9 pages, HP Labs Bristol, Hewlett-Packard Company, Bristol, UK.

\* cited by examiner

| unique identifiers of senders | Contents of Messages | Confidence levels |
|---|---|---|
| xyz | msg-1 | 0.9 — 501 |
|  | msg-1' | 0.9 — 503 |
| ... | ... | ... |
| qxy |  | 0.9 — 505 |

Fig. 5

Database entries

| unique identifiers of senders: Incoming | unique identifiers of senders: Outgoing | Contents of Messages | Confidence levels |
|---|---|---|---|
| abc | xyz | msg-1 | 0.1 |
|  |  | msg-1' | 0.7 |
| . . |  | . . | . . |
| bde |  |  | 0.001 |

Fig. 11

| Analyses | Setting or adjusting confidence level |
|---|---|
| High frequency of incoming messages with an identical content (1201) | Likely Malware: set high or adjust higher |
| High frequency of outgoing messages with an identical content (1203) | Likely Malware: set high or adjust higher |
| High frequency of similar outgoing or incoming messages (1205) | Likely Malware: set high or adjust higher |
| Correlation between an incoming event and outgoing messages (1207) | Likely Malware: set high or adjust higher |
| Check the reputation, in a database, of the URL of an incoming message (1209) | Set or adjust according to the reputation |
| Ask the user within the enterprise (a trusted user) whether to receive and/or send a questionable message (1211) | Set or adjust according to the response |

Fig. 12

METHODS AND SYSTEMS FOR DETECTING AND PREVENTING THE SPREAD OF MALWARE ON INSTANT MESSAGING (IM) NETWORKS BY USING FICTITIOUS BUDDIES

FIELD OF THE INVENTION

This invention relates to reducing the spread of malware on Instant Messaging networks. In particular, this invention relates to detecting and preventing the spread of malware on Instant Message networks by introducing fictitious buddies into buddy lists.

BACKGROUND OF THE INVENTION

Instant messaging (IM) is a popular method of communication over the Internet. IM offers several features that other means of communication over the Internet (e.g., e-mails) do not offer. For instance, IM allows "real-time" communication between users. Also, IM users can see whether friends or co-workers are present to participate in dialogs. Owing to these and other features, the number of users actively using IM has grown to substantial levels for both personal and professional uses. For personal uses, America On Line (AOL), Microsoft Network (MSN), Yahoo!, ICQ, and others provide IM services. Some of these services are free of charge (i.e., public IM services), and some charge subscriptions (i.e., hosted IM services). For professional uses, corporations, e.g., International Business Machines (IBM), offer enterprise IM servers that can be installed on enterprise premises and can offer IM services to authorized users within the enterprise.

As shown in FIG. 1, a typical IM system includes an IM server 103 and many IM clients 101, 105. IM clients are computer programs that can be installed and executed on host computers. The IM server 103 is operated by an IM service provider, which can be a hosted, public, or enterprise IM service provider. A more comprehensive description of a conventional IM system is provided in U.S. Application, Publication Number 20040088546, entitled "System and method for add-on services, secondary authentication, authorization and/or secure communication for dialog based protocols and systems," which is incorporated herein by reference in its entirety.

All users who sign up for IM services are given unique identifiers, which can be a combination of characters and numbers (hereinafter the "account names"). Users can publicize their account names to other users with whom they wish to communicate. The list of the account names with which a user wishes to communicate using IM is referred to as a "Buddy List" in AOL Instance Messenger and Yahoo! Messenger, and a "Contact List" in MSN Messenger and ICQ. Hereafter, the term "buddy list" refers to the "Buddy List," "Contact List," or other similar lists.

In operation, the IM client 101 creates a communication connection (e.g., a TCP connection) with the IM server 103. Once a connection is established between the IM server 103 and the IM client 101, the connection is "permanent", and IM protocol packets are exchanged between the IM client 101 and the IM server 103. The IM protocol packets include:

1. Logon—These packets contain the account name of the user wishing to logon to the IM server 103 and a password (typically encrypted) that the IM server 103 can use to authenticate the user's identity.
2. Status—These packets allow the logged-on user to publish a status, for example: ready to receive messages, temporarily busy to respond, not present to receive messages, etc. The status information is published to other users of the IM server 103 who are potentially interested in communicating with the user.
3. Buddy Lists—These packets contain names of other users ("buddies") with whom the user is interested in communicating. These packets can also show the status of the buddies.
4. Messages—These packets contain messages. When the user communicates with a buddy, message packets are sent from the IM client 101 over the TCP connection. The IM server 103 then "pushes" the message packets to the IM client of the buddy.

Two unique characteristics of IM:
1. IM clients have permanent TCP connections to IM servers. The collection of IM clients and their IM servers constitutes a "fully" connected network.
2. IM is characterized by "pushing" messages to the recipient (i.e., IM clients). In other words, when a user (i.e., logged-on at an IM client) sends a message to a buddy, the message is automatically delivered to the buddy (i.e., another IM client) over a TCP connection it already had established. This contrasts to other means of communication such as world-wide-web and email, where all content is pulled.

As with other means of communication over the Internet, IM is vulnerable to attacks by "malware" programs. Here, malware refers to, without limitation, viruses, worms, SPIMs (i.e., SPAMs for IM), Trojan horses, spy ware, malcode, etc. Malware also refers to messages that contain any references (e.g., pointers or URLs) to any of the malware just listed.

Malware can "infect" computers (e.g., turning computers into sources of malware, corrupting storages devices of computers, etc.) that host IM clients in a variety of ways. For instance, malware can take the advantage of the "fully" connected and "pushing" messages characteristics of IM by sending messages from one user's host computer to host computers of the buddies. This spreading process can be repeated when the malware arrives at each of the host computers of the buddies. In this way, malware can rapidly propagate and penetrate a large number of computers. Theoretically, malware can spread to 10 million host computers in 2 hours at a very conservative rate of propagation. Conventional security systems (e.g., firewalls, virus detectors, etc.) do not address this and other types of new threats posed by malware on IM.

SUMMARY OF THE INVENTION

Various embodiments of the present invention provide methods and systems to prevent the spread of malware by identifying the new threats and addressing them. In particular, embodiments of the present invention provide an IM filter module (IM FM) configured to intercept a buddy list sent from an IM server to an IM client, add one or more fictitious buddies to the intercepted buddy list, and forward the buddy list with the one or more fictitious buddies to the IM client. The IM FM is further configured to identify a computer that hosts the IM client as a source of malware based on messages sent by the IM client to at least one of the fictitious buddies and to determine that the host computer of the IM client is a source of malware if a content of the messages sent to the at least one of the fictitious buddies contains malware. The IM FM can also identify messages as malware messages, if the messages are from the IM client determined as a source of malware.

BRIEF DESCRIPTION OF THE DRAWINGS

Embodiments of the present invention will be best understood when read in reference to the accompanying figures wherein:

FIG. 5 is a table illustrating the organization of information stored in a centralized database of various embodiments of the present invention;

FIG. 11 is a table illustrating the organization of information stored in a database of various embodiments of the present invention;

FIG. 12 is a table listing various analyses performed by the IM FM of various embodiments of the present invention;

DETAILED DESCRIPTION OF EMBODIMENTS OF THE PRESENT INVENTION

Each embodiment of the present invention described below addresses particular techniques to identify (e.g., detect) and block (e.g., prevent) the spread of malware on IM networks. Embodiments of the present invention can operate as standalone techniques or as combined techniques that incorporate all or a combination of various embodiments of the present invention described below.

Figure 1:
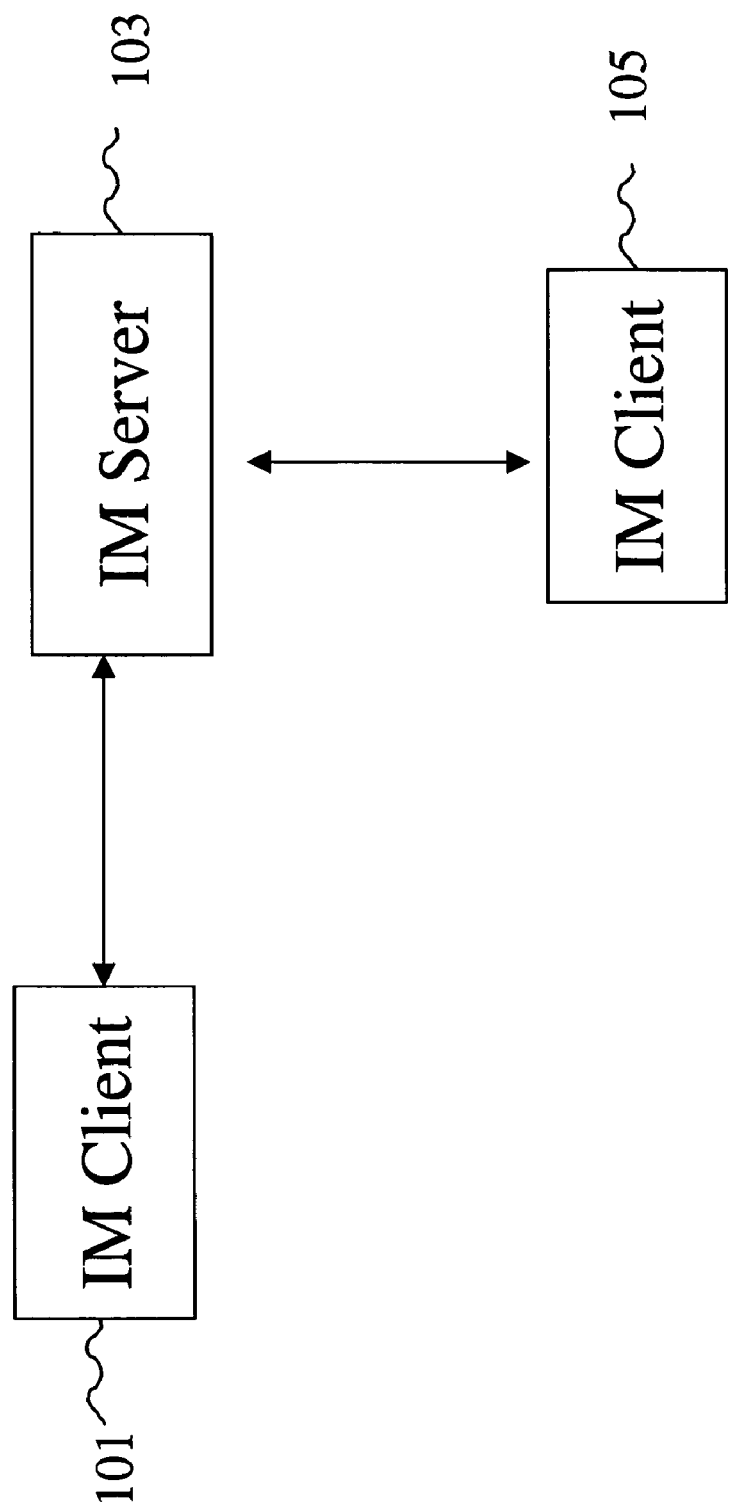
FIG. 1 is a block diagram illustrating a conventional IM system.
Figure 2:
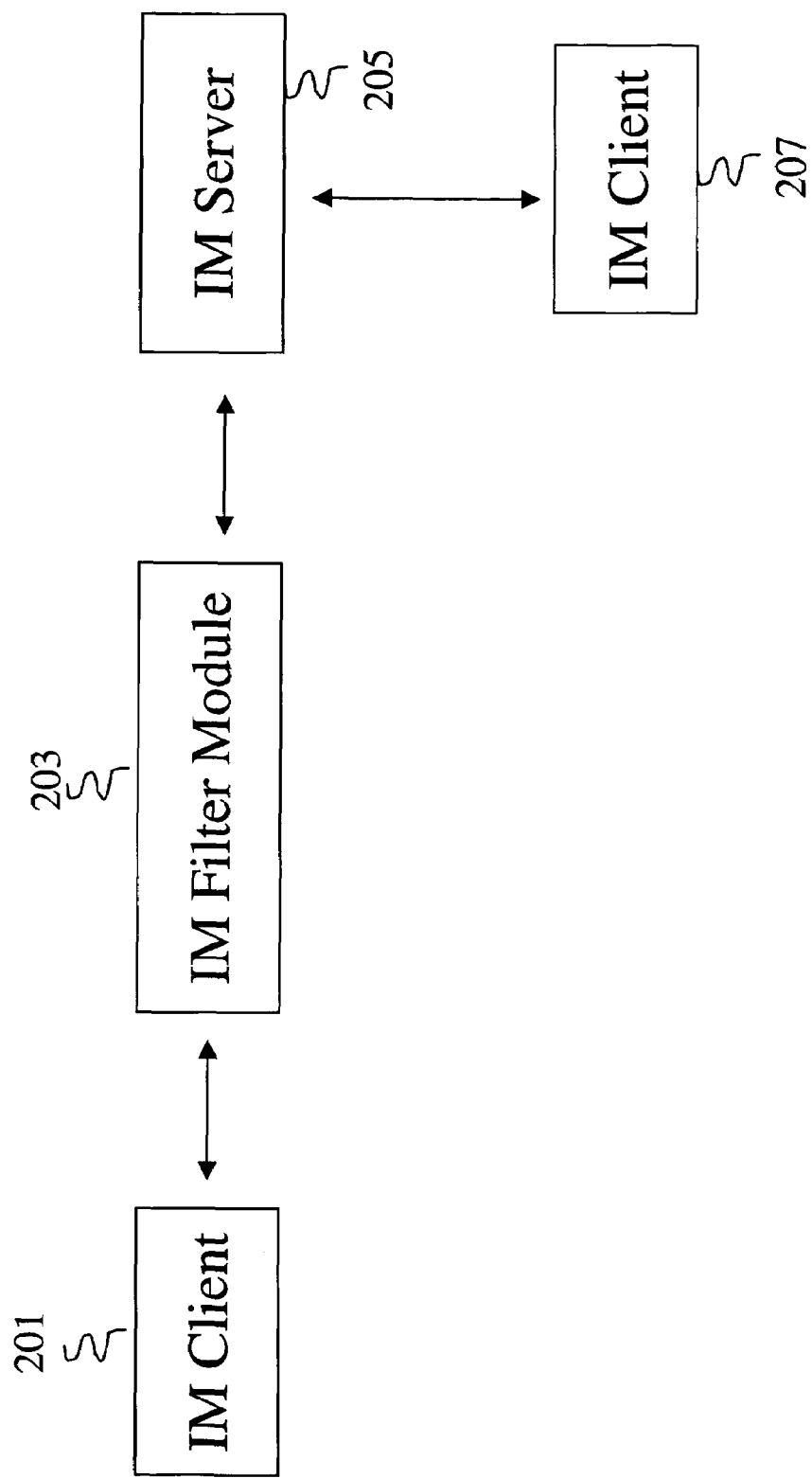
FIG. 2 is a block diagram illustrating an IM system that includes an IM filter module (IM FM) of various embodiments of the present invention.

Embodiments of the present invention, as shown in FIG. 2, include an IM filter module (IM FM) 203 between an IM client 201 and an IM server 205. The IM FM 203 is preferably implemented in computer programs; however, it can also be implemented in firmware and/or hardware in combination with computer programs. The IM server 205 and IM client 201 exchange communication packets (e.g., logon, status, buddy list, messages, etc.). By placing the IM FM 203 between the IM client 201 and IM server 205, the IM FM 203 can be configured (e.g., computer programmed) to intercept all communication packets exchanged between the IM client 201 and IM server 205. The IM FM 203 also examines all intercepted communication packets (including their headers and payloads). Based on the examination, the IM FM 203 can block certain messages from being delivered to their destinations.

Although FIG. 2 shows that the IM FM 203 being coupled to only one IM client 201, the IM FM 203 can be coupled to many IM clients. In fact, the IM FM 203 can be coupled to every IM client within an enterprise (e.g., within a company firewall). The IM FM 203 can also be coupled to many different IM servers of different IM service providers. Here, being "coupled to" means having the capacity to establish a communication link and to exchange communication packets.

As computer programs (e.g., a set of executables), the IM FM 203 can be hosted on (e.g., executed on) a number of different computers. For instance, in an enterprise setting, the IM FM 203 can be hosted on the same computer that hosts the enterprise's firewall. The IM FM 203 can also be hosted on the same computer that hosts the IM client 201 or the IM server 205. Indeed, embodiments of the present invention do not require that the IM FM 203 be hosted on any specific computer, as long as the IM FM 203 can intercept communication packets exchanged between the IM client 201 and IM server 205 and block the delivery of certain packets.

Figure 3:
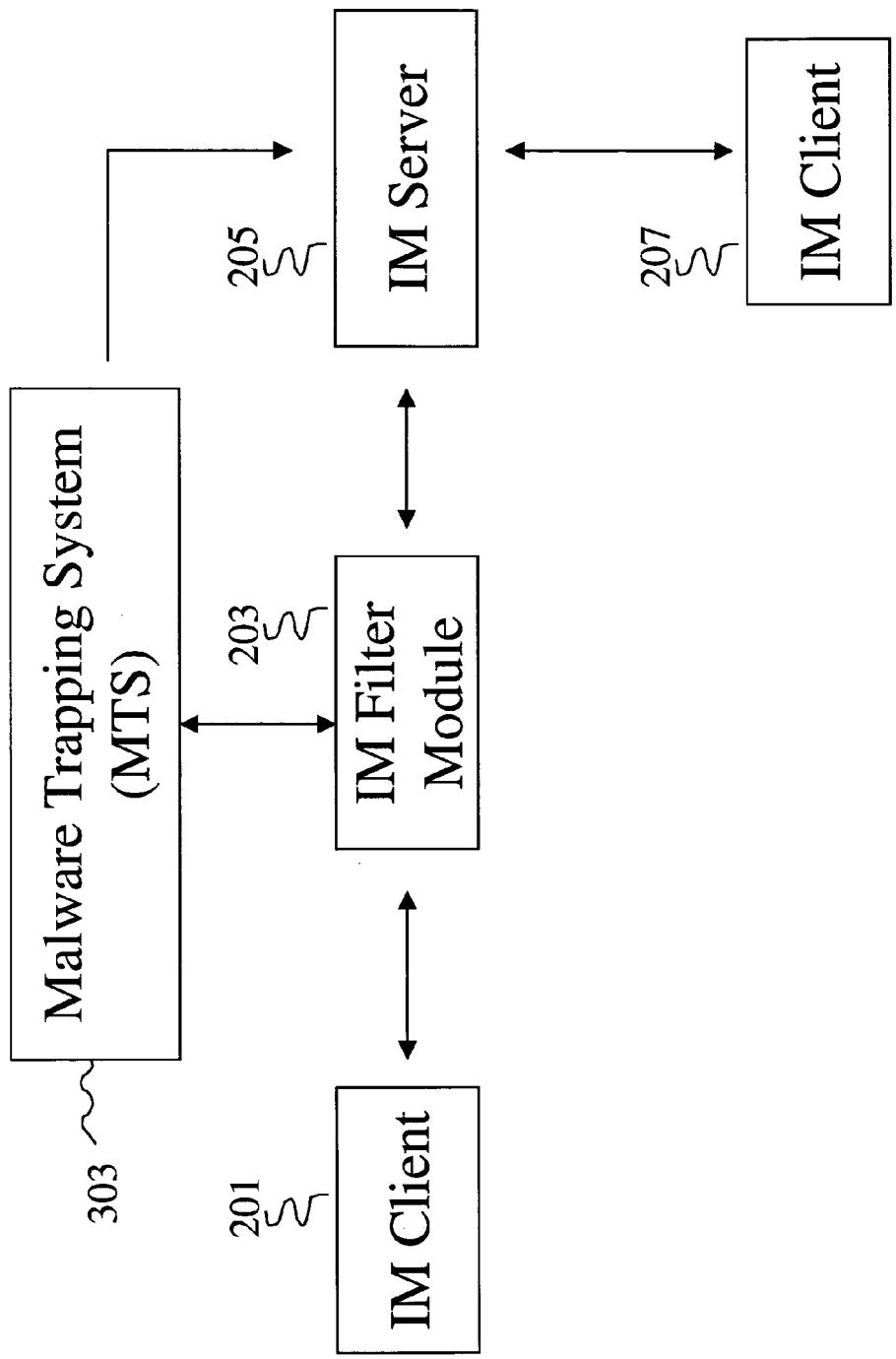
FIG. 3 is a block diagram illustrating an IM system that includes an IM FM and a Malware Trapping System of various embodiments of the present invention.

As noted above, IM is open to a variety of attacks by malware. Some operators of malware would obtain a list of IM account names of unsuspecting users and send messages that contain malware ("malware messages") to those users in mass. Here, an operator of malware can be a computer application(s) and/or a person(s) running a computer application that sends malware messages to unsuspecting IM users. In order to identify and block malware messages, embodiments of the present invention provide a Malware Trapping System (MTS) 303, which is coupled to the IM FM 203, as shown in FIG. 3. The MTS 303 can be hosted on the same computer that hosts the IM FM 203. The MTS 303 can also be hosted on the same computer that hosts the IM server 205 or IM client 201. The MTS 303 and IM FM 203 preferably communicate with each other on a secured communication link.

Figure 4:
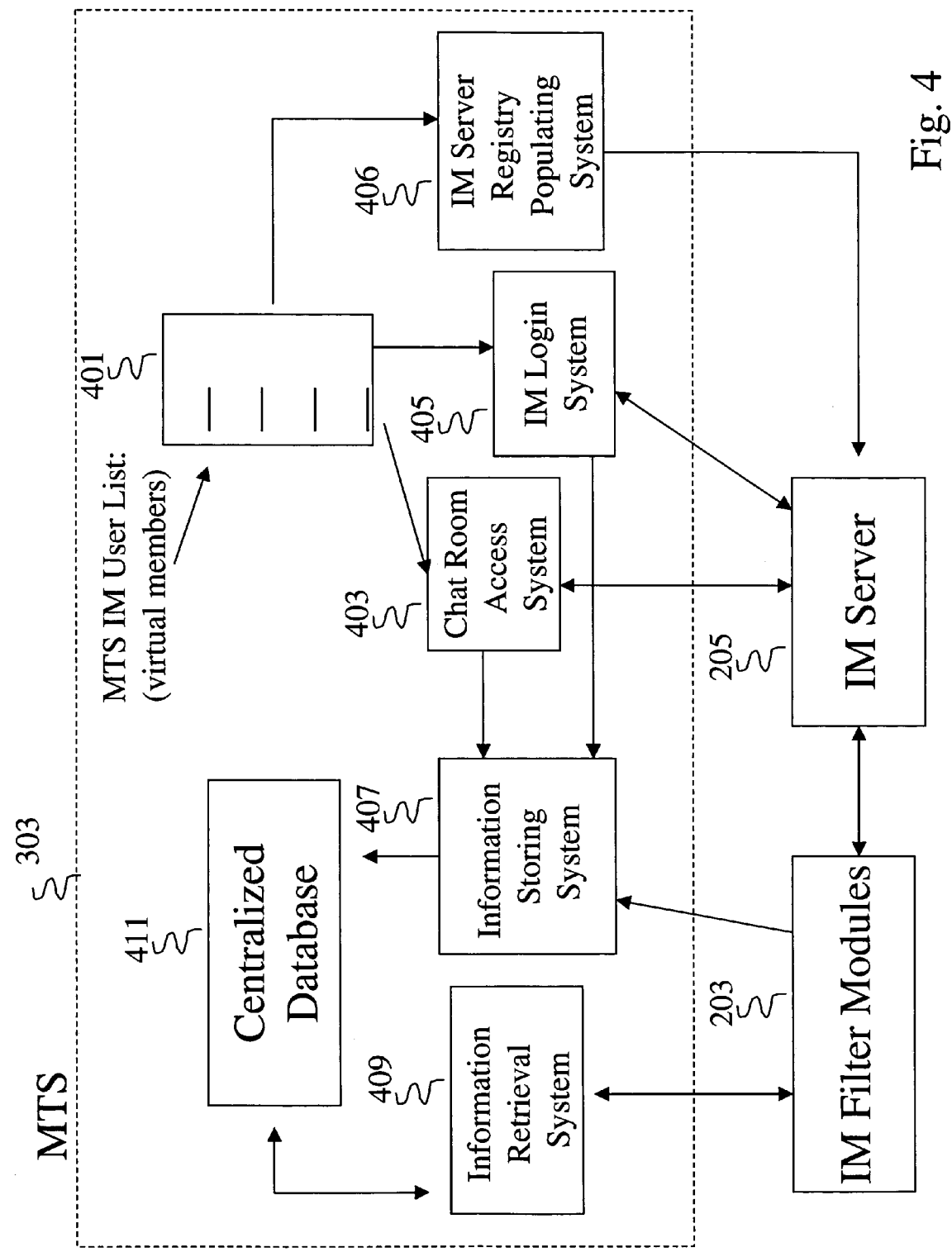
FIG. 4 is an exploded view of a Malware Trapping System of various embodiments of the present invention.

The MTS 303 is a computer resource (e.g., a set of computer programs), designed to be indistinguishable from a real resource, whose value lies in unauthorized or illicit use of that resource. In other words, a goal of the MTS 303 is to lure operators of malware to send messages to the MTS. For this purpose, the MTS 303 includes, among other things, as shown in FIG. 4, an MTS IM User List 401, which contains a list of virtual users (e.g., automated users) and their account names. The account names of virtual users are not associated to any real person. While virtual users enjoy all IM services available to any other users, virtual users are solely created to elicit operators of malware to send malware messages thereto. If any IM user sends messages to any virtual user, then that IM user is identified as a source of malware, and the messages from that IM user are identified as malware messages. In order to deceive operators of malware to communicate with the virtual members, the account names of the virtual users are publicized.

FIG. 4 illustrates example systems used in publicizing the account names of the virtual users and used in identifying malware messages: an IM server registry populating system (IM RPS) 406, an IM login system (IM LS) 405, and a Chat Room Access System (CR AS) 403, which are all computer resources (e.g., computer programs). The IM RPS 406 accesses an "IM server registry," which is also referred to as an "IM server directory," an "IM server user database" or other similar names. However it is called, the IM server registry contains the account names of registered users of the IM server 205 and some relevant information about the users (e.g., ages, income levels, home addresses, etc.). The IM RPS 406 automatically registers the account names of the virtual users with the IM server 205, which in turn adds the account names to its IM server registry. The IM RPS 406 also generates fictitious information (e.g., ages, income levels, home addresses, etc.), and forwards that information to the IM server 205 during the registration process. The fictitious information can be tailored to entice operators of malware to communicate with the registered virtual users. For instance, if it is known that certain operators of malware prefer to send SPIMs to users of a certain age group (e.g., 30-40) and a certain income level (e.g., over $50,000 of income per year), then the IM RPS 406 generates fictitious information that is tailored to meet those preferences and registers virtual users with that information.

Regarding the number of registered virtual users to be registered to a particular IM server, embodiments of the present invention do not impose any limit. However, an extremely large number of registered virtual users can be too expensive to implement and unnecessary. Embodiments of the present invention prefer to set the number of registered virtual users to be statistically significant in order to trap malware messages. For instance, if a typical operator of malware is known to send malware messages to at least one thousand unsuspecting users per IM server, then the number of registered virtual users can be set to $\frac{1}{1,000}^{th}$ of the total number of users for an IM server. In this example, if the total number of users for an IM server is 1,000,000, then about 1,000 registered virtual users would be sufficient to ensure that at least one registered virtual user receives a malware message. In some embodiments, the MTS 303 is connected to many different IM servers provided by different IM services. For these embodiments, MTS 303 can register an identical set or different sets of virtual users for each IM service.

As it is widely known, operators of malware obtain account names of unsuspecting users by, for example, performing unauthorized accesses to IM server registries or purchasing such information from third parties. When an operator of malware sends a message to a registered virtual user, the IM server 205 forwards the message to an IM Login System 405, which is described in detail later. Upon receiving the message, the IM LS 405 collects information about the message (e.g., a unique identifier of the sender and the content of the message). The IM LS 405 forwards the collected information to an Information Storing System (ISS) 407, which causes the collected information to be stored in a centralized database 411. By repeating this process, the centralized database 411 becomes a depository of unique identifiers of sources of malware as well as contents of malware messages.

The centralized database 411 can organize the stored information as illustrated in FIG. 5: a column for unique identifiers of senders of messages that have been identified as containing malware, a column for the contents of malware messages, and a column for confidence levels. The unique identifiers can be IM account names, IP header information, the IP addresses of senders, or the like, that can be used to uniquely identify sources of malware. The contents of the messages are typically text messages. A confidence level represents the probability of an entry in the centralized database containing an actual malware message and/or an actual source of malware. For instance, as shown in FIG. 5, "msg-1" has 0.9 (out of 1.0) probability of actually containing malware, and "qxy" has 0.9 probability of actually being a source of malware. The confidence levels can be all set to one value (e.g., 0.9) for the messages that are sent to one or more virtual users. The confidence levels can be adjusted (e.g., set higher or lower) as more information becomes available. As illustrated in FIG. 5, entries in the centralized database can have unique identifiers only (e.g., 505), contents of messages only (e.g., 501), or both (e.g., 503).

The IM FM 203 can access the stored information in the centralized database 411. In particular, the IM FM 203 accesses the information stored in the centralized database via an Information Retrieval System (IRS) 409. The IM FM 203 can copy the information stored in the centralized database 411 to a local database (not shown), and/or it can inquire about the reputation (i.e., the confidence level) of one or more unique identifiers or one or more message contents. Since the IM FM 203 examines all messages exchanged between the IM client 201 and IM server 205, it can compare the unique identifier and/or the content of each message with the information available in the centralized database 411. If the IM FM 205 finds one or more messages that contain unique identifiers that are identical or similar and/or messages that contain contents that are identical to those stored in the centralized database 411, the IM FM 203 blocks those messages from being delivered to their destinations.

Moreover, the IM FM 203 can block messages that contain unique identifiers or contents that are similar (but not identical) to an entry stored in the centralized database 411. In particular, the IM FM 203 copies the entries of the centralized database 411 to a localized database. When a new message that contains a unique identifier or content that is similar to an entry stored in the local database, then an additional entry is made to the localized database with the information from the new message. Its confidence level would be adjusted lower. For instance, if the content in the new message is 90% similar to a content stored in the local database, then the confidence level can be lowered by 10%. The IM FM 203 can be configured to block messages with confidence levels higher than a certain value (e.g., 0.8). The IM FM 203 can also report any additional entries in the local database to the centralized database 411 via the Information Storing System 407.

Figure 6:
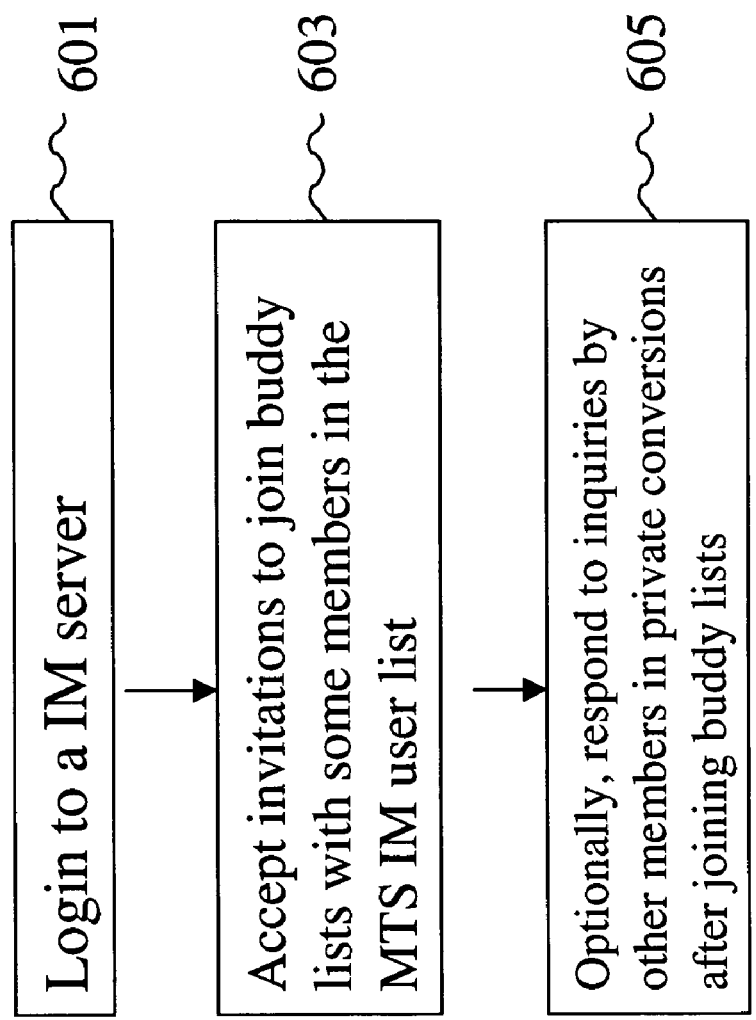
FIG. 6 is a flow chart of the operation of an IM login system of various embodiments of the present invention.

Some operators of malware collect account names by joining groups of buddies, connecting to chat rooms or the like. To publicize the account names of the registered virtual users in those venues, the MTS 303 also includes an IM LS 405 and a CR AS 403. A function of the 1M LS 405 is to make one or more registered virtual users available to participate in dialogs with buddies. The IM LS 405 first performs log-on steps (see, e.g., step 601 in FIG. 6) as one of the registered virtual users. Although the operations of the IM LS 405 are described using one registered virtual user, the steps can be repeated many times with different registered virtual users, as many as are statistically significant to identify malware messages. After the logon steps, the IM LS 405 accepts, for the logged-in virtual member, invitations to join various buddy lists (see, e.g., step 603). After joining the buddy lists, the IM LS 405 can set its status as present to participate in dialogs. The IM LS 405 can be present passively and wait to receive messages. The way in which the IM LS 405 automatically logs-on to the IM server 205 and receives messages from other users is known in the art and is described in a co-pending application, entitled "SYSTEM ANT) METHOD FOR BUILDING INSTANT MESSAGING APPLICATIONS," (the "Instant Messaging" application), filed on Jul. 1, 2005, application number Ser. No. 11/171,642, and publication number 20070005711, which is incorporated herein by reference in its entirety.

When a registered virtual user receives a message, the message likely contains malware, and the sender of such a message is likely be an operator of malware. The IM LS 405 collects information from the message and stores it in the centralized database 411 as described above in connection with the MTS IM User List 401. As noted above, the information stored in the centralized database 411 is used by the IM FM 203 to identify and block likely malware messages and messages originated from likely sources of malware.

Figure 8:
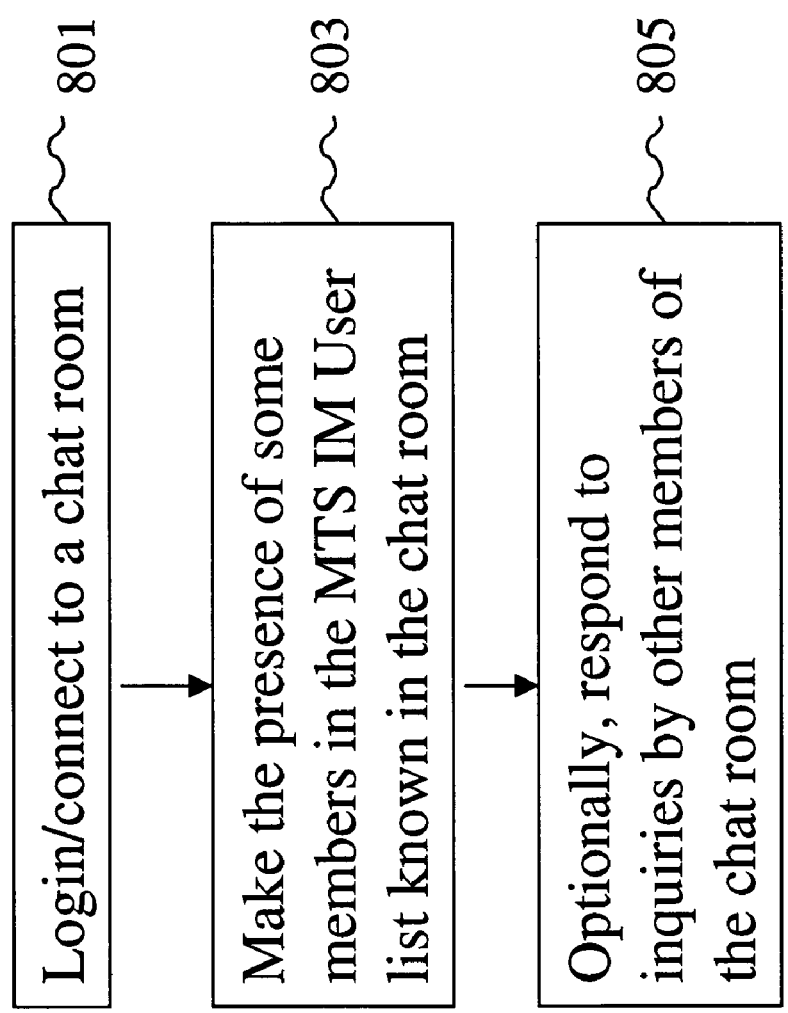
FIG. 8 is a flow chart of the operation of a chat room access system of various embodiments of the present invention.

Regarding the CR AS, 403, it first connects to a chat room using the account name of a virtual user (see, e.g., step 801 in FIG. 8). Although the operations of the CR AS 403 are described using one user, it can be repeated many times with different virtual users, as many as are statistically significant to identify sources of malware. After the connection, the CR AS 403 can set its status as present to participate in a dialog (see, e.g., step 803). The CR AS 403 can be present passively and wait to receive a message. The way in which the CR AS 403 automatically connects to the IM server 205 and exchanges messages with other members is known in the art and is described in the Instant Messaging application.

Various sources of malware would collect the account names of users of chat rooms, log on to IM servers, and send malware messages to the users of the IM servers. As described above, when the IM LS 405 receives a message, the message likely contains malware, and the originator of such a message is likely an operator of malware. The IM LS 405 collects information from the received message and stores it in the centralized database 411 as described above in connection with the MTS IM User List 401. As noted above, the information stored in the centralized database 411 is used by the IM FM 203 to block malware messages and messages originated from likely sources of malware.

However, some operators of malware would not collect the account names of chat room members who passively wait to receive messages. These operators of malware would observe and determine if a member is actively participating in a dialog. Only after such an observation is made, do such operators of malware collect the account names of those members who participated in dialogs. In order to elicit these operators of malware to collect the account names of the registered virtual users, the CR AS 403 can automatically participate in a dialog (e.g., exchange messages) with buddies (see, e.g., step 805).

Figure 7:
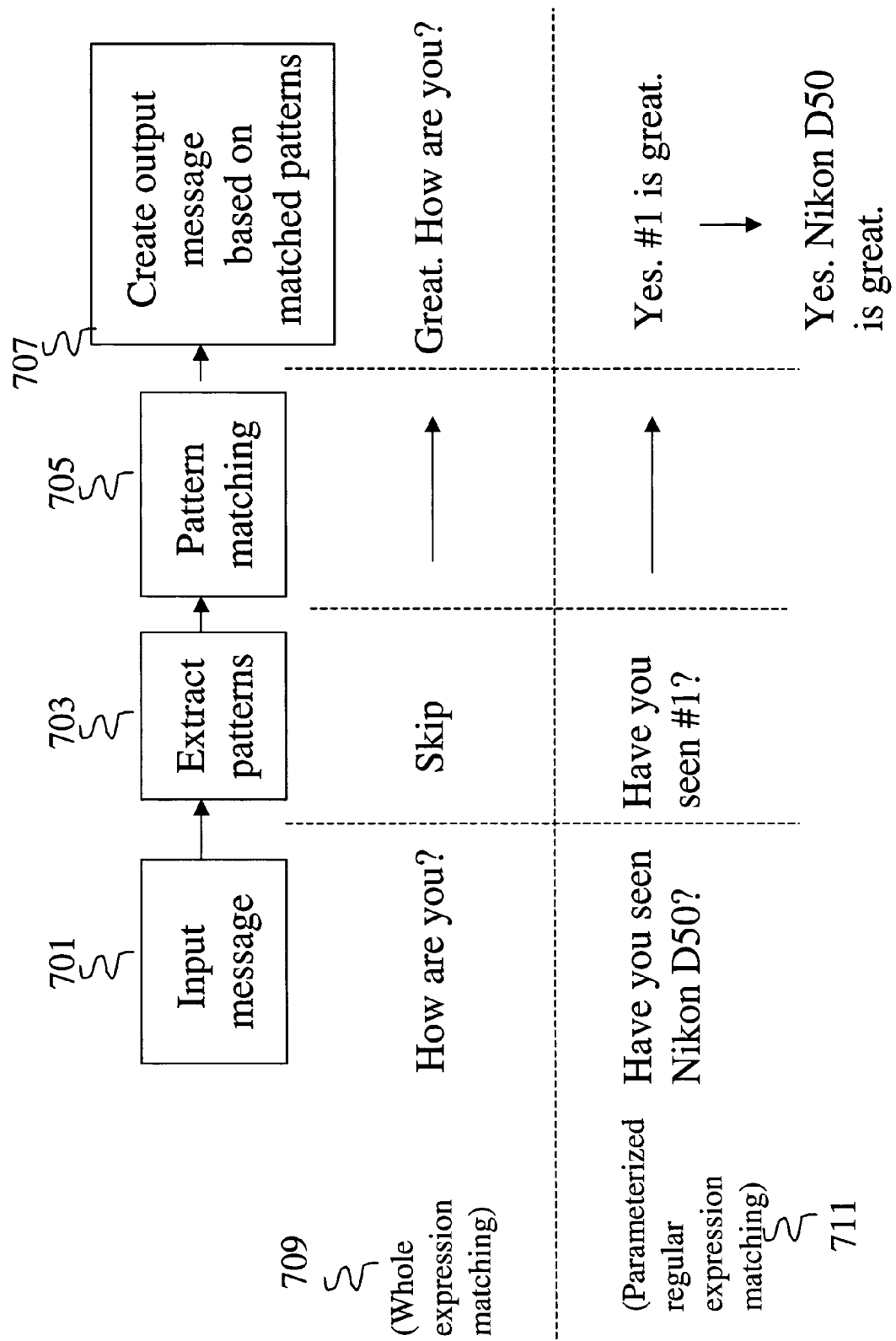
FIG. 7 is a flow chart and examples of pattern matching techniques of various embodiments of the present invention.

In particular, as shown in FIG. 7, the CR AS 403 receives a message (i.e., an "input message") 701. The CR AS 403 optionally extracts one or more patterns from the input message (step 703). The CR AS 403 then matches the one or more patterns 705 (or the whole expression) against patterns and/or expressions stored in a pattern database (not shown). The pattern database typically includes, for each input expression pattern, an associated one or more output expression patterns. If there is a match in the pattern database, the CR AS 403 forms a message based on the output expression patterns obtained from the pattern database.

FIG. 7 illustrates two examples: a whole expression matching technique 709 and a parameterized regular expression matching technique 711. In the whole expression matching technique 709, the input expression of "How are you?" is searched in the pattern database. In this technique, the step of extracting patterns can be omitted. Once the input expression is matched in the pattern database, the output expression is obtained, which is "Great. How are you?," in this example. The CR AS 403 creates a message with the obtained expression and sends the message as a response to the input message.

In the parameterized regular expression matching technique 711, the CR AS 403 recognizes certain generalized patterns (e.g., "Have you seen #1?") and specific patterns (e.g., "#1" refers to "Nikon D50"). The generalized patterns are searched in the pattern database to locate a corresponding output pattern (e.g., "Yes. #1 is great."). The CR AS 403 then forms an output expression using the now-obtained output pattern along with the specific pattern (e.g., "Yes. Nikon D50 is great.").

The whole expression matching and parameterized regular expression matching techniques are described only as examples. Conventional matching techniques can also be used in combination with the example techniques described above. For instance, conventional natural language processing techniques can be used. The IM LS 405 can also automatically participate in dialogs (see, e.g., step 605) using the pattern matching techniques described above in connection with FIG. 7.

With the best protections against malware, the computer that hosts an IM client can still be infected with malware. In such an instance, the infecting malware would quickly attempt to replicate itself by sending malware messages to other IM clients. Since an IM client stores a local copy of the IM user's buddy list, the malware that infected the host computer can be configured to obtain the buddy list and send messages out to the users listed on the buddy list. These steps (i.e., infecting, obtaining the buddy list, and then sending messages to the buddies) can be rapidly repeated to infect many IM clients and their host computers.

Figure 9:
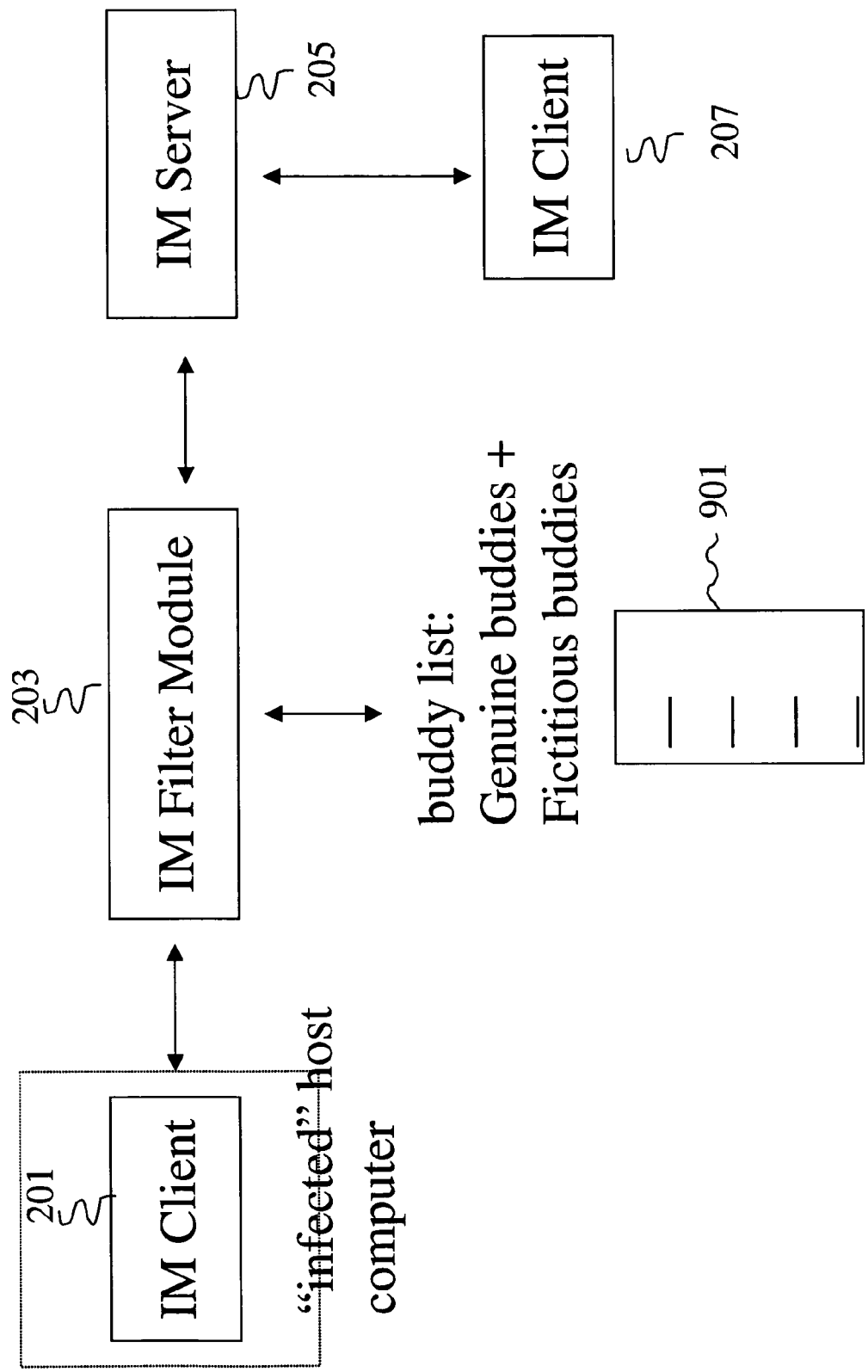
FIG. 9 is a block diagram illustrating an IM system that includes an IM FM of various embodiments of the present invention that introduces fictitious buddies.

In order to prevent the spread of such malware, the IM FM 203 can be configured to add fictitious buddies into the buddy list. In particular, as described above, the IM FM 203 can intercept all communication packets exchanged between the IM server 205 and IM client 201, including the communication packets that contain buddy lists. As the IM client 201 logs-on to the IM server 205, the IM server 205 sends the buddy list of the logged-on user of the IM client 201. Upon intercepting the buddy list, the IM FM 203 inserts one, two, or more fictitious buddies to the buddy list. The modified buddy list (901 in FIG. 9) is then forwarded to the IM client 201.

If the IM client 201 sends one or more messages to the fictitious buddies, the computer that hosts the IM client 201 is most likely infected with malware. If so, the IM FM 203 blocks any messages originated from the IM client 201. In particular, the IM FM 203 blocks messages originated from the IM client 201 and sent to the IM server 205 as well as any messages sent to other IM clients belonging to the enterprise of the infected IM client.

The unique identifiers and/or the contents of messages from the infected host computer are sent to the centralized database 411 via the ISS 407 (and/or stored in a local database). The stored information is used by the IM FM 203 to examine other messages.

The IM FM 203 can block messages from the IM client 201 when one message from the IM client 201 is sent to one fictitious buddy. However, the IM FM 203 can also perform additional steps to ensure that the host computer of the IM client 201 is actually infected. For instance, the IM FM 203 can send a confirmation message to the IM client 201. The confirmation message asks the user of the IM client to confirm that the user intended to send the message to the fictitious buddy. If the user confirms it, then it is unlikely that the host computer is infected. But, if the user denies it, the IM FM 203 determines that the host computer is infected.

Some forms of malware send messages only to the buddies that have sent messages to the user of the IM client 201. In order to elicit such malware to send messages, the IM FM 203 periodically sends a message (e.g., a test message) to the user of the IM client 201 using the account names of the fictitious buddies. If the IM client 201 sends one or more messages to the fictitious buddy in response, the IM FM 203 determines that the host computer is infected with a high confidence level (e.g., 0.7). This can be further confirmed by analyzing the messages sent by the IM client 201 to the fictitious buddies. For instance, if too many messages are sent by IM client 201 within too short of an interval to be typed by a person, then the host computer of the IM client 201 is highly likely infected. In another example, if the contents of the messages sent by the IM client 201 contain malware, the IM FM 203 determines that the host computer is infected with a very high confidence level (e.g., 0.9).

The IM FM 203 can also add fictitious buddies to the buddy lists of many IM clients (e.g., IM clients belonging to the same enterprise to which the IM client 201 belongs) and perform the above-described functions. The IM FM 203 can, for example, determine that two or more IM clients are infected if those IM clients send messages containing identical contents (e.g., containing the same URL) to the fictitious buddies.

As described above, the IM FM 203 can be coupled to the centralized database 411 via the IRS 409 and ISS 407. More specifically, the information stored in the centralized database 411 can also be used by the IM FM 203 to confirm whether or not the host computer of the IM client 201 is infected. For instance, if the contents of the messages sent to the fictitious buddies are identical or similar to the contents of messages stored in a database (e.g., the central database 411), then the IM FM 203 determines that the host computer of the IM client 201 is infected with a very high level of confidence. Moreover, the IM FM 203 can cause an information storing system (e.g., the ISS 407) to store onto a database (e.g., the centralized database 411) the contents and/or unique identifiers of messages sent from the host computer that has been infected.

Figure 10:
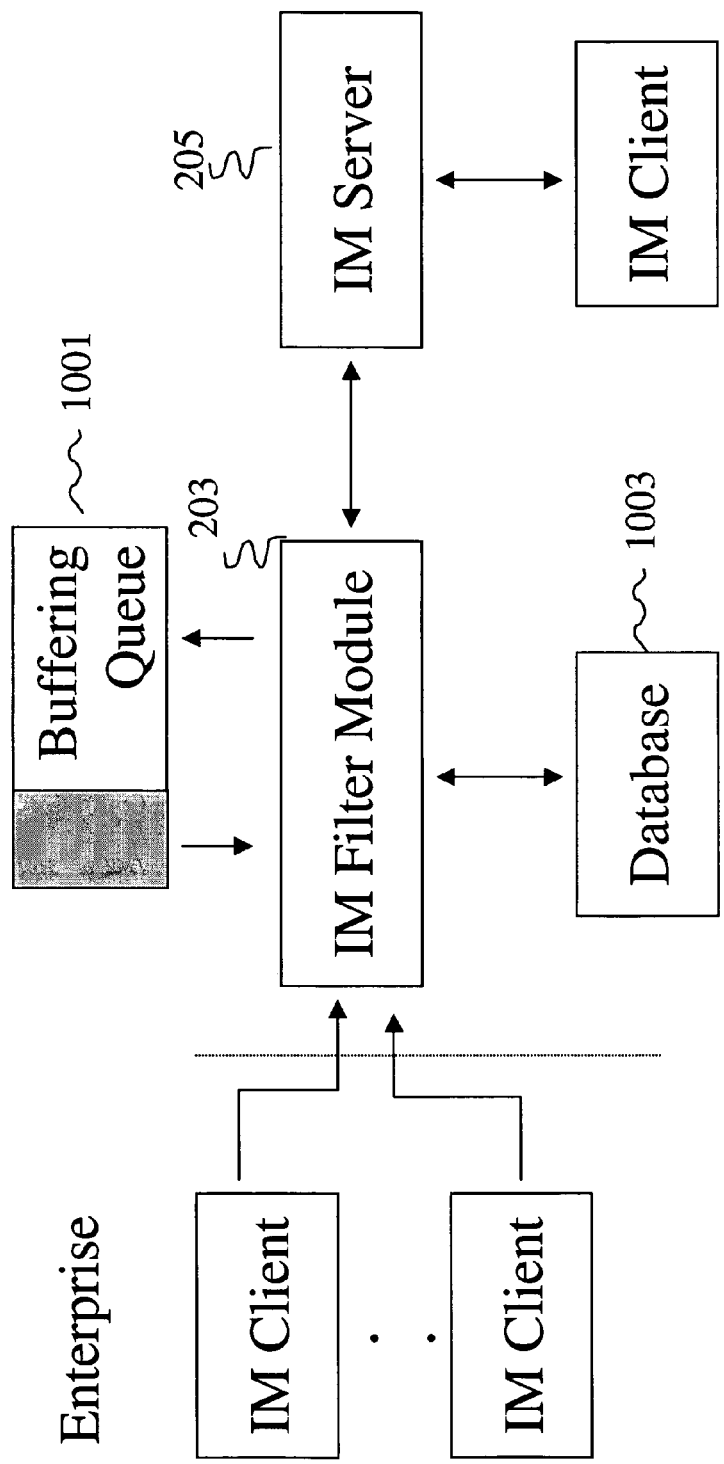
FIG. 10 is a block diagram illustrating an IM system that includes an IM FM of various embodiments of the present invention that analyzes message traffic patterns.

Some malware can infect computers before the IM FM 203 that uses the techniques described above identifies and blocks it. The IM FM 203 can be configured to identify and block malware messages by analyzing message traffic patterns between the IM server 205 and IM client 201. More specifically, the IM FM 203 analyzes message traffic patterns by examining all messages between the IM client 201 and the IM server 205. The messages include incoming messages, which are sent by the IM server 205 to the IM client 201, and outgoing messages, which are sent by the IM client 201 to the IM server 205 and to, eventually, another IM client. As shown in FIG. 10, all messages can be temporarily stored in a buffering queue 1001 while the analyses are performed. If IM FM 203 determines that certain messages do not contain malware, those messages are sent to their destinations. If the IM FM 203 determines that certain messages do contain malware, then they are blocked from being sent to their destinations. The IM FM 203 collects and stores information about messages that it has determined to likely contain malware onto a local database 1003.

The local database 1003 can store the information organized as illustrated in FIG. 11: a column for unique identifiers of senders of incoming messages that have been identified as containing malware, a column for unique identifiers of senders of outgoing messages that have been identified as containing malware, a column for the contents of the malware messages, and a column for confidence levels. The unique identifiers, contents of messages, and confidence levels have been described above in connection with the centralized database 411. Although the centralized database has been described as organizing information as described in FIG. 5, the centralized database can organize its information as described in FIG. 11 as well. This allows information stored in the localized database 1003 and the centralized database 411 to be easily exchanged.

The following is a list of analyses that the IM FM 203 can perform. The IM FM 203 can perform all, only one, or any combination of them depending on the security threat level. In other words, if it is known that there is a high likelihood of future attacks by various malware, all of the listed analyses can be performed.

Analysis 1: A high frequency of outgoing messages that have identical contents (see, e.g., 1203). The IM FM 203 can determine that a message contains malware if the IM FM 203 identified previous outgoing messages that contain identical contents for a certain number of times. The IM FM 203 can examine outgoing messages sent by a number of IM clients (e.g., IM clients belonging to the same enterprise as the IM client 201). For example, if the IM FM 203 detected three or more messages with identical contents, then the IM FM 203 can determine that all three messages contain malware. The number three here is an arbitrary number. The user of the IM FM 203 can set the number. In another example, when the IM FM identifies two messages with identical contents, the IM FM sets the confidence level to a particular value (e.g., 0.51). However, as the number of messages containing the identical content increases, the confidence level can be set higher proportional to the number of messages with identical contents.

Analysis 2: A high frequency of identical incoming messages with identical contents (see, e.g., 1201).

Analysis 3: A high frequency of identical incoming or outgoing messages with identical contents (see, e.g., 1205). For Analysis 2 and 3, the IM FM 203 is configured to function similarly with Analysis 1.

For Analyses 1-3, confidence levels can be adjusted even if there are messages with similar contents instead of messages with identical contents. For the messages with similar contents, confidence levels can be adjusted proportionately to the similarities between the contents. In some embodiments, for messages with similar contents, confidence levels can be adjusted higher based on the number of messages with similar contents that meet certain criteria. For instance, if two or more messages contain contents that are 95% identical each to other and the messages are rapidly sent, the two messages are treated as identical messages.

Analysis 4: A high correlation between an incoming event and a number of outgoing messages subsequent to the incoming event (see, e.g., 1203). If an incoming event is closely followed by a large number of outgoing messages, then the incoming event was likely originated from a source of malware and the outgoing messages may contain malware. The confidence level can be set high or adjusted higher as the number of outgoing messages increases following an incoming event. Examples of an incoming event are an incoming message, an incoming presence event (i.e., a third party IM client joins the buddy list and/or makes itself available for a dialog), or the like.

Analysis 5: The speed at which the IM client sends outgoing messages. If too many messages are originated from the IM client 201 (too fast to be typed and sent by a person), then the outgoing messages likely contain malware. The confidence level can be set high or adjusted higher as more and more messages are sent from the IM client too fast to be typed by a person.

Analysis 6: The lengths of the messages. The IM FM calculates and stores statistical information (e.g., averages and standard deviations) relating to the lengths of message contents. The IM FM can calculate and store the statistical information relating to various categories of messages: all messages, incoming messages, and outgoing messages. For each message it receives and stores to the buffering queue 1001, the IM FM 203 calculates its content length. If the length of a particular message is a statistical outlier (e.g., the message content is longer or shorter by two standard deviations from the average), the confidence level that the message contains malware is set high or adjusted higher. The comparison can be made with the statistical information of a particular category of messages. For instance, the length of an incoming message can be compared against the statistical information of the lengths of other incoming messages. Also, the length of an outgoing message can be compared against the statistical information of the lengths of other outgoing messages.

Analysis 7: The lengths of the tokens. This analysis can also performed on tokens after breaking up messages into tokens and collecting statistical information on the lengths of the tokens. The IM FM 203 calculates and stores statistical information (e.g., averages and standard deviations) relating to the lengths of message contents. The IM FM 203 can calculate and store the statistical information relating to various categories of messages: all messages, incoming messages, and outgoing messages. For each message it receives and stores to the buffering queue 1001, the IM FM 203 calculates its content length. If the length of a particular message is a statistical outlier (e.g., the message content is longer or shorter by two standard deviations from the average), the confidence level that the message contains malware is set high or adjusted higher. The comparison can be made with the statistical information of a particular category of messages. For instance, the length of an incoming message can be compared against the statistical information of the lengths of other incoming messages. Also, the length of an outgoing message can be compared against the statistical information of the lengths of other outgoing messages.

The results of the above-described analyses can be expressed in binary decisions. For instance, if the confidence level of a message is higher than a certain value (e.g., 0.8), then that message would be identified as containing malware. Messages having confidence level below 0.8 would be identified as not containing malware.

In addition to the above-described example analyses of IM messages, the IM FM 203 can also be configured to analyze certain aspects of individual IM messages to determine if they contain malware.

Analysis 8: The IM FM 203 examines contents of messages. If the content of a message includes a URL, then the IM FM 203 resolves the URL to its final target URL. If the final target URL is a known source of malware, then the message is identified as malware, and the sender of that message is identified as a source of malware.

Analysis 9: The IM FM 203 can be configured to include all, or any combination of, the above-described embodiments. For instance, the IM FM 203 can have access to the centralized database 411 and/or can add fictitious buddies to buddy lists in addition to having the ability to perform any or all of the above describe analyses.

Analysis 10: The IM FM 203 can send a confirmation message to a trusted user regarding a suspicious message (see, e.g., 1211). The confirmation message can ask whether the user wishes to receive or send the suspicious message. If the answer is no, then the confidence level is adjusted higher. If answer is yes, then the confidence level is adjusted lower.

Figure 13:
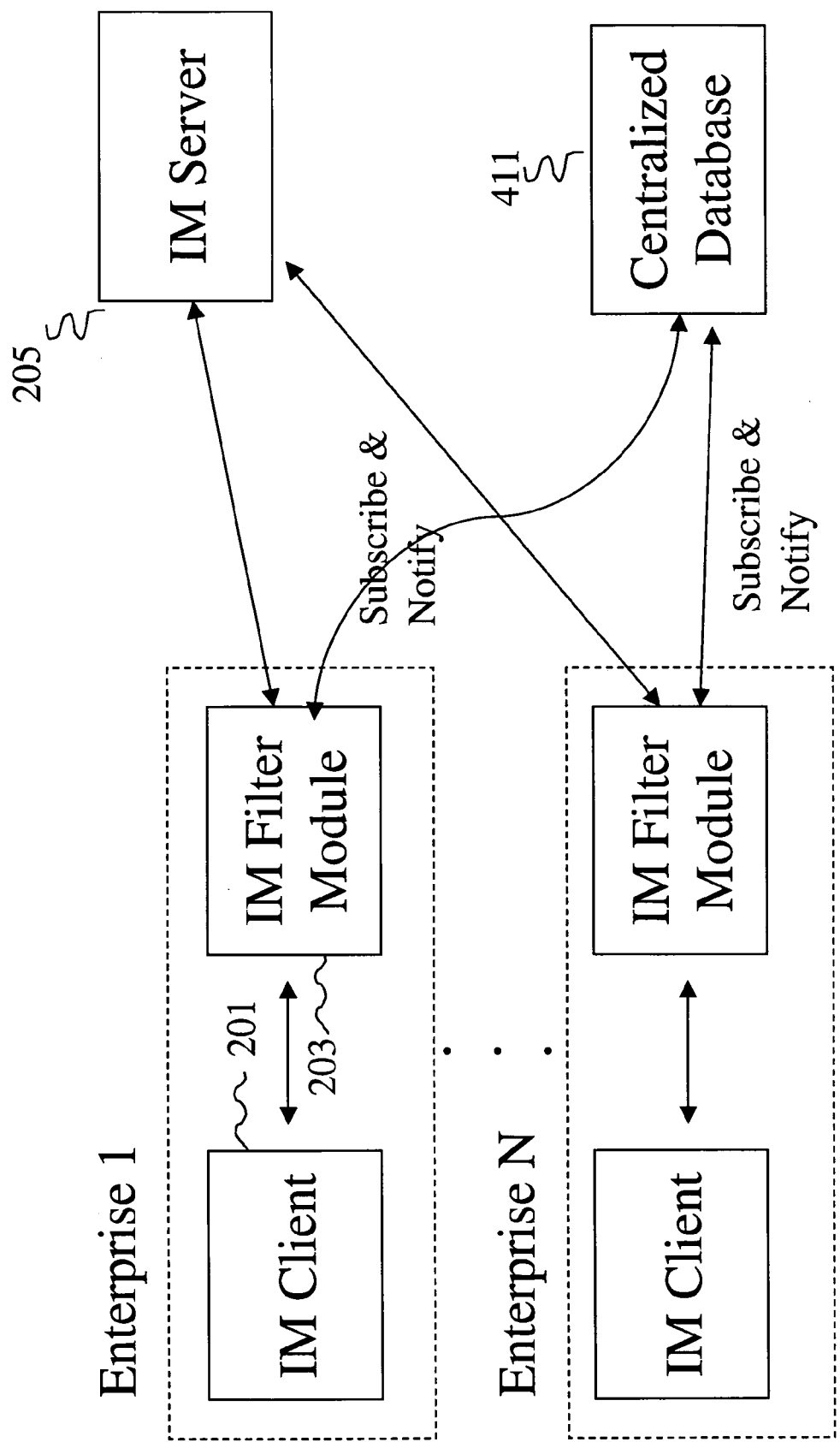
FIG. 13 is a block diagram illustrating an IM system that includes IM FMs of various embodiments of the present invention in a multiple enterprises environment.

Many IM FMs from a number of different enterprises can cooperate with each other via the centralized database 411. More specifically, as illustrated in FIG. 13, the IM FM 203 of enterprise 1 can subscribe to the centralized database 411. This allows the IM FM 203 to use the information relating to malware messages stored in the centralized database 411. In addition, the IM FM 203 can notify the centralized database 411 regarding messages that contain similar contents or that are from sources with similar unique identifiers as those stored in the centralized database 411. An IM FM located in a different enterprise can also subscribe and notify the centralized database 411. By providing a network of IM FMs, the system shown in FIG. 13 can rapidly identify new types of malware and their sources.

As described above, in many instances the confidence values are either decreased or increased based on various analyses. The exact amount of the increases or decreases can be determined heuristically (e.g., the past experience of the user of the IM FM 203). However, in some embodiments of the present invention, a Bayesian filter 1405 can be employed to determine the amount of the increases or decreases. Bayesian filters for recognizing "junk" e-mail or the like are known in the art. For instance, U.S. Pat. No. 6,161,130, which is incorporated herein by reference, describes a technique that uses a "probabilistic classifier to detect 'junk' e-mail."

The IM FM 203 uses a typical Bayesian filter to obtain a block list. However, embodiments of the present invention use a feedback system to train and re-train the Bayesian filter by continually updating the training set of the Bayesian filter.

In operation, the IM FM 203 analyzes messages exchanged between the IM server 205 and IM client 201 as discussed above in connection with FIGS. 9-12. The IM FM 203 identifies one or more messages as containing malware among the analyzed messages. Initially, the IM FM 203 can use, for example, the centralized database 411 to identify messages as possibly containing malware. Information from the messages identified as possibly containing malware is collected. For instance, the collected information can include the unique identifiers of the messages, the contents of the messages, and/or confidence levels. The collected information is referred to as the training set 1401. The Bayesian filter then uses the training set to train itself. The Bayesian filter can use any known training techniques. After the training, the Bayesian filter outputs a block list 1403, which contains the same list of messages as those listed in the training set and the associated confidence levels that have been adjusted by the training process. The IM FM 203 uses the block list 1403 in analyzing additional messages that have been collected on the buffering queue 1001. The IM FM 203 creates a modified training set that adds new messages that have been identified as possibly containing malware based on the block list 1403. The Bayesian filter 1405 then uses the modified training set to re-train itself and generate a modified block list. The re-training can take place at a regular interval (e.g., every one or more seconds) or after a triggering event (e.g., a notification that the IM FM 203 has updated the training set. The feedback process (i.e., the process of repeatedly generating the modified training set, re-training the Bayesian filter, and generating the modified block list) between the IM FM 203 and Bayesian filter 1405 allows embodiments of the present invention to adapt to new threats of malware.

Figure 14:
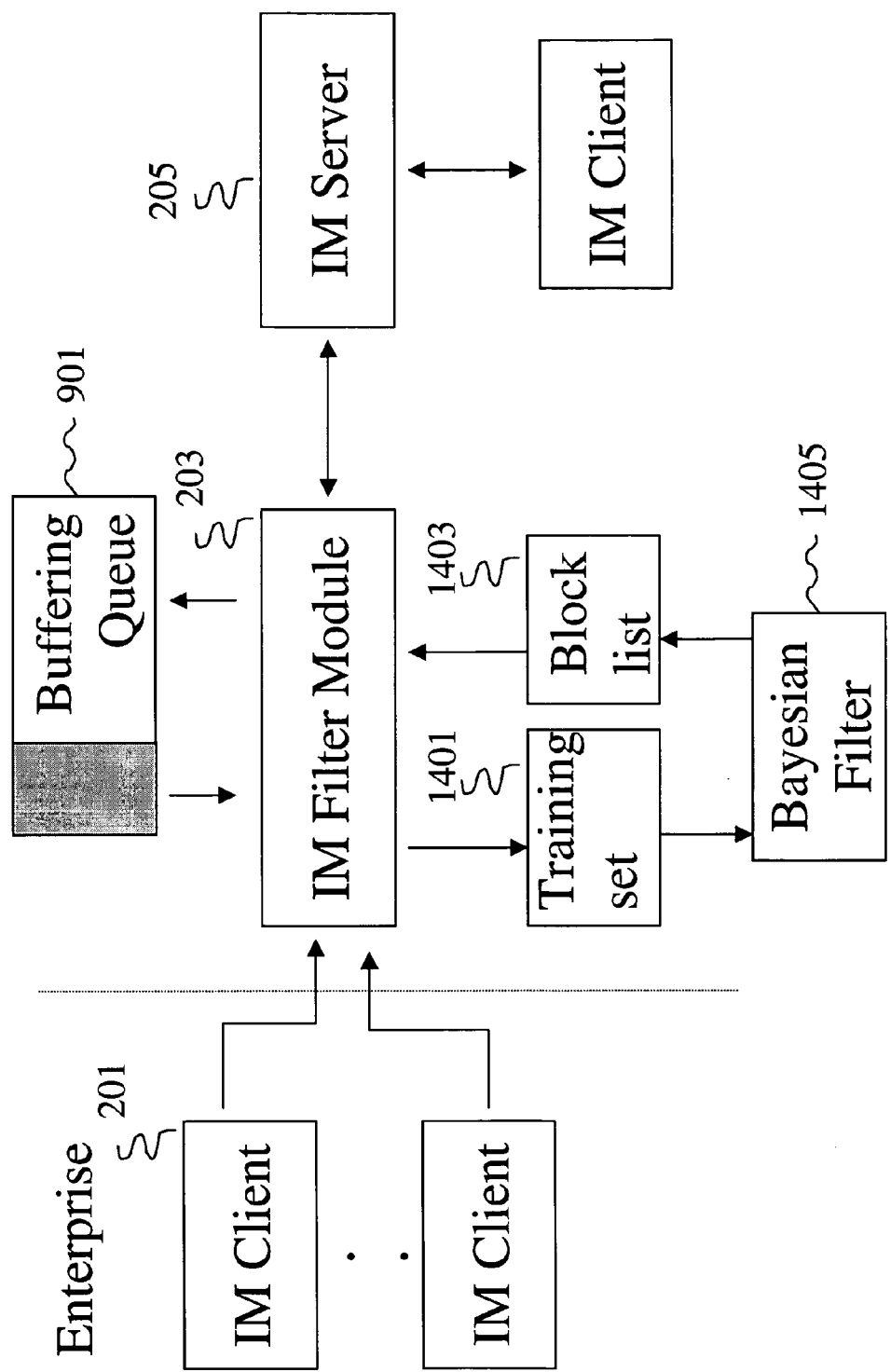
FIG. 14 is a block diagram illustrating an IM system that includes an IM FM of various embodiments of the present invention that uses a Bayesian filter.
Figure 15:
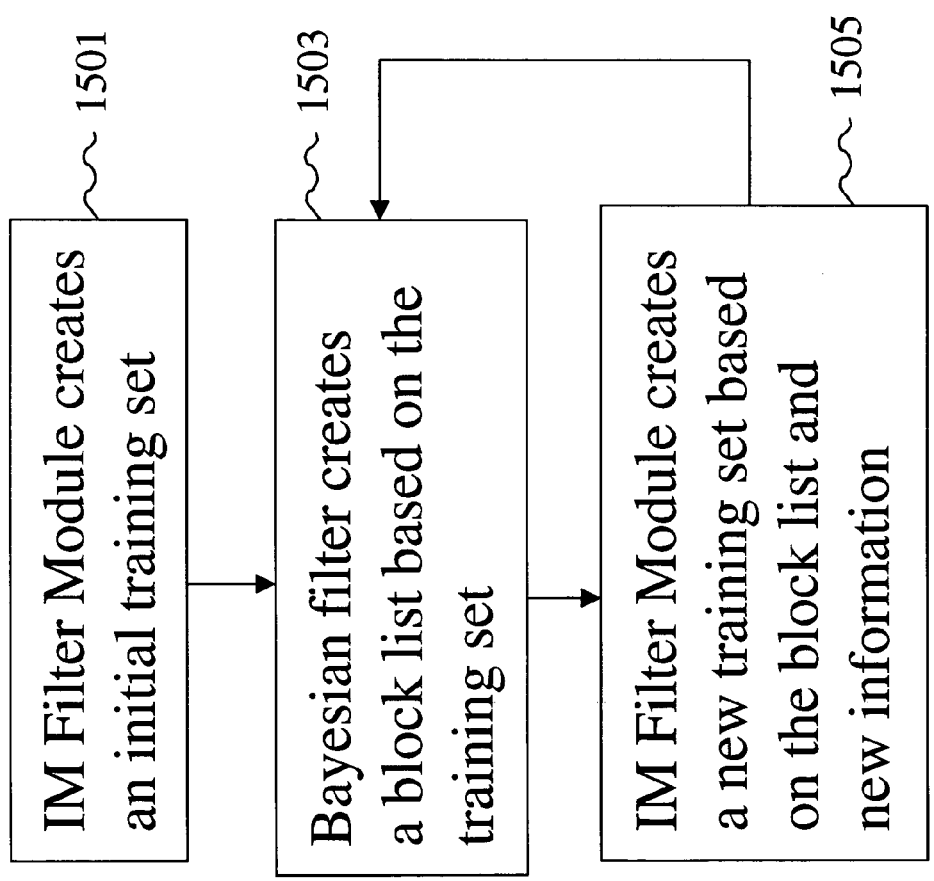
FIG. 15 is a flow chart illustrating a feedback training system of various embodiments of the present invention.

The above-described Bayesian filter along with the feedback technique can be used in conjunction with one, a combination, or all of various embodiments described above. In particular, the IM FM 203 illustrated in FIG. 14 can be used with the MTS 303 and can be configured to add fictitious buddies and performs various analyses. For example, analyses (i.e., Analysis 1-10). For example, the Bayesian filter 1405 can determine the presence of malware based on various inputs: contents of messages (for Analysis 1-3); the times at which messages are sent or received (for Analysis 4-5); and certain statistical information (for Analysis 6-7). The IM FM 203 shown in FIG. 14 can also have access to the centralized database 411.

Regarding Analysis 1-3, the Bayesian filter working with the IM FM 203 identifies a certain number of messages as containing malware if the certain number of messages contains an identical content. The Bayesian filter, by its training steps, can determine whether some messages contain identical contents and adjust the confidence levels accordingly.

Regarding Analysis 4, the Bayesian filter working with the IM FM 203 identifies messages sent by the IM client 201 as containing malware if the IM client 201 sends a large number of messages after receiving one message from the IM server 205. The Bayesian filter, by its training steps, can determine what is a too large of number of message to be sent out after one incoming event and adjust the confidence levels accordingly.

Regarding Analysis 5, the Bayesian filter working with the IM FM 203 identifies two or more messages sent by the IM client 201 as containing malware if the two or more messages are sent at too short of an interval to be sent by a person. The Bayesian filter, by its training steps, can determine how many is too many messages to be sent out by a person typing the messages and adjust the confidence levels accordingly.

Regarding Analysis 6 and 7, the Bayesian filter working with the IM FM 203 identifies a message as containing malware based on statistical information provided to the Bayesian filter (e.g., the statistical information relating to the length of messages and/or length of tokens) via the training set 1401. The Bayesian filter, by its training steps, can determine what messages contain statistical extreme values (and thereby likely malware messages) and adjust the confidence levels accordingly.

Parts of the present invention and corresponding detailed description are presented in terms of software, computer programs, or algorithms. Software includes symbolic representations of operations or steps stored in the form of data bits within a computer memory. An algorithm is a sequence of steps leading to a desired result(s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system's memories or registers or other such information storage, transmission or display devices.

Various embodiments and advantages of the present invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to falling within the scope of the invention. For example, some embodiments are described using one IM client examples. However, various embodiments (e.g., adding fictitious buddies, various analyses of messages, Bayesian filtering techniques) can be used with multiple IM clients. While the foregoing invention has been described in detail by way of illustration and example of various embodiments, numerous modifications, substitutions, and alterations are possible without departing from the scope of the invention defined in the following claims.

What is claimed is:

1. A computer-assisted method of reducing spread of malware in an instant message (IM) system, comprising:
    intercepting a buddy list sent from an IM server to an IM client;
    adding one or more fictitious buddies to the intercepted buddy list;
    forwarding the buddy list with the one or more fictitious buddies to the IM client;
    identifying that a computer that hosts the IM client sent a message to at least one of the fictitious buddies;
    interactively confirming with a user of the IM client whether the user intended to send the message; and
    responsive to the user denying sending the message to the at least one of the fictitious buddies, identifying the host computer of the IM client as a source of malware.

2. The method of claim 1, wherein identifying the host computer of the IM client as a source of malware further comprises:
    determining that the host computer of the IM client is a source of malware if a content of the messages sent to the at least one of the fictitious buddies contains malware.

3. The method of claim 1 further comprising:
    blocking messages originating from the IM client if the host computer of the IM client has been identified as a source of malware.

4. The method of claim 1 further comprising:
    sending a test message to the IM client using an account name of one of the fictitious buddies.

5. The method of claim 4 further comprising:
    determining that the host computer of the IM client is a source of malware if the IM client
    sends a message in response to the test message.

6. The method of claim 4 further comprising:
    sending a confirmation message to a user of the IM client if the IM client sends a message in response to the test message; and
    identifying the host computer of the IM client as a source of malware if the user denies sending the response message.

7. The method of claim 4 further comprising:
    identifying the host computer of the IM client as a source of malware when a response to the test message by the IM client is too fast to be a response by a person.

8. The method of claim 1 further comprising:
    storing, into a database, unique identifiers of messages sent by the IM client if the host computer of the IM client has been identified as a source of malware.

9. The method of claim 8 further comprising:
    blocking any message that is sent by a user of the IM server having an identical or similar unique identifier with any unique identifiers stored in the database.

10. The method of claim 1 further comprising:
    storing, into a database, contents of messages sent by the IM client if the host computer of the IM client has been identified as a source of malware.

11. The method of claim 10 further comprising:
    blocking any message that contains an identical or similar content with contents of messages stored in the database.

12. The method of claim 1 further comprising:
identifying, as sources of malware, a plurality of computers each hosting an IM client if messages with identical contents are sent from each of the plurality of host computers.

13. The method of claim 12 further comprising:
blocking any message that contains an identical or similar content with contents of messages send by the plurality of host computers identified as sources of malware.

14. A computer-assisted system of reducing spread of malware in an instant message (IM) system, comprising:
an IM filter module configured to intercept a buddy list sent from an IM server to an IM client, add one or more fictitious buddies to the intercepted buddy list, and forward the buddy list with the one or more fictitious buddies to the IM client; and
the IM filter module further configured to identify that a computer that hosts the IM client sent a message to at least one of the fictitious buddies, interactively confirm with a user of the IM client whether the user intended to send the message, and identify the host computer of the IM client as a source of malware in response to the user denying sending the message to the at least one of the fictitious buddies.

15. The system of claim 14, wherein the IM filter module is further configured to determine that the host computer of the IM client is a source of malware if a content of the messages sent to the at least one of the fictitious buddies contains malware.

16. The system of claim 14, wherein the IM filter module is further configured to block messages originating from the IM client if the host computer of the IM client has been identified as a source of malware.

17. The system of claim 14, wherein the IM filter module is further configured to send a test message to the IM client using an account name of one of the fictitious buddies.

18. The system of claim 17, wherein the IM filter module is further configured to determine that the host computer of the IM client is a source of malware if the IM client sends a message in response to the test message.

19. The system of claim 17, wherein the IM filter module is further configured to:
send a confirmation message to a user of the IM client if the IM client sends a message in response to the test message; and
identify the host computer of the IM client as a source of malware if the user denies sending the response message.

20. The system of claim 17, wherein the IM filter module is further configured to identify the host computer of the IM client as a source of malware when a response to the test message by the IM client is too fast to be a response by a person.

21. The system of claim 14 further comprising:
a database configured to store unique identifiers of messages sent by the IM client if the host computer of the IM client has been identified as a source of malware.

22. The system of claim 21, wherein the IM filter module is further configured to block any message that is sent by a user of the IM server having an identical or similar unique identifier with any unique identifiers stored in the database.

23. The system of claim 14 further comprising:
a database configured to store contents of messages sent by the IM client if the host computer of the IM client has been identified as a source of malware.

24. The system of claim 23, wherein the IM filter module is further configured to block any message that contains an identical or similar content with contents of messages stored in the database.

25. A computer program product comprising a computer-readable medium storing computer instructions for configuring a computer to perform steps comprising:
intercepting a buddy list sent from an IM server to an IM client;
adding one or more fictitious buddies to the intercepted buddy list;
forwarding the buddy list with the one or more fictitious buddies to the IM client;
identifying that a computer that hosts the IM client sent a message to at least one of the fictitious buddies;
interactively confirming with a user of the IM client whether the user intended to send the message; and
responsive to the user denying sending the message to the at least one of the fictitious buddies, identifying the host computer of the IM client as a source of malware.

26. The product of claim 25, wherein the instructions for identifying the host computer of the IM client as a source of malware further comprise instructions for:
determining that the host computer of the IM client is a source of malware if a content of the messages sent to the at least one of the fictitious buddies contains malware.

27. The product of claim 25 further comprising instructions for:
blocking messages originating from the IM client if the host computer of the IM client has been identified as a source of malware.

28. The product of claim 25 further comprising instructions for:
sending a test message to the IM client using an account name of one of the fictitious buddies.

29. The product of claim 28 further comprising instructions for:
determining that the host computer of the IM client is a source of malware if the IM client sends a message in response to the test message.

30. The product of claim 28 further comprising instructions for:
sending a confirmation message to a user of the IM client if the IM client sends a message in response to the test message; and
identifying the host computer of the IM client as a source of malware if the user denies sending the response message.

31. The product of claim 28 further comprising instructions for:
identifying the host computer of the IM client as a source of malware when a response to the test message by the IM client is too fast to be a response by a person.

32. The product of claim 25 further comprising instructions for:
storing, into a database, unique identifiers of messages sent by the IM client if the host computer of the IM client has been identified as a source of malware.

33. The product of claim 32 further comprising instructions for:
  blocking any message that is sent by a user of the IM server having an identical or similar unique identifier with any unique identifiers stored in the database.

34. The product of claim 25 further comprising instructions for:
  storing, into a database, contents of messages sent by the IM client if the host computer of the IM client has been identified as a source of malware.

35. The product of claim 34 further comprising instructions for:
  blocking any message that contains an identical or similar content with contents of messages stored in the database.

36. The product of claim 25 further comprising instructions for:
  identifying, as sources of malware, a plurality of computers each hosting an IM client if messages with identical contents are sent from each of the plurality of host computers.

37. The product of claim 36 further comprising instructions for:
  blocking any message that contains an identical or similar content with contents of messages send by the plurality of host computers identified as sources of malware.

* * * * *

UNITED STATES PATENT AND TRADEMARK OFFICE
CERTIFICATE OF CORRECTION

PATENT NO. : 7,600,258 B2
APPLICATION NO. : 11/171248
DATED : October 6, 2009
INVENTOR(S) : Francis Aurelio DeSouza et al.

It is certified that error appears in the above-identified patent and that said Letters Patent is hereby corrected as shown below:

In claim 13, Column 15, Line 8, replace "send" with --sent--, and

In claim 37, Column 18, Line 11, replace "send" with --sent--.

Signed and Sealed this

Fifth Day of January, 2010

David J. Kappos
*Director of the United States Patent and Trademark Office*